Aug. 30, 1955  S. B. RENNERFELT  2,716,357
CONTINUOUSLY VARIABLE SPEED GEARS
Filed July 7, 1952  3 Sheets-Sheet 1

INVENTOR
Sven Bernhard Rennerfelt,
BY Pierce, Scheffler & Parker.
ATTORNEYS.

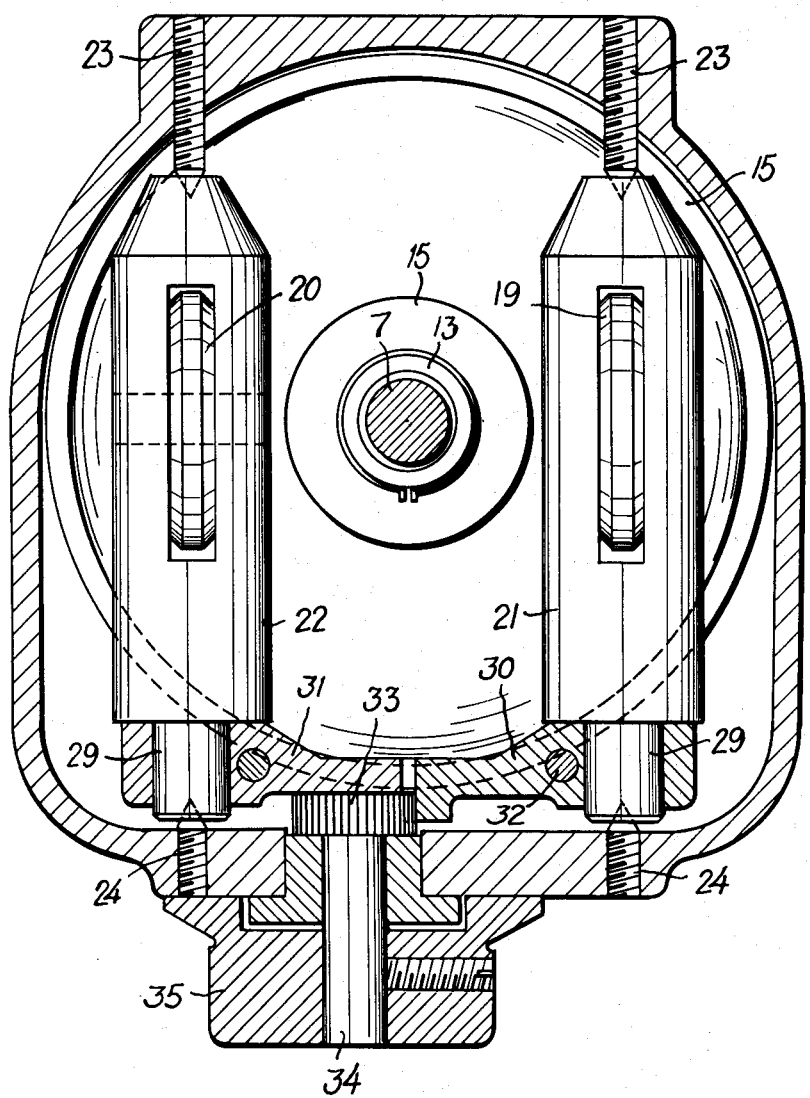

United States Patent Office 2,716,357
Patented Aug. 30, 1955

2,716,357

CONTINUOUSLY VARIABLE SPEED GEARS

Sven Bernhard Rennerfelt, Goteborg, Sweden

Application July 7, 1952, Serial No. 297,421

1 Claim. (Cl. 74—691)

The invention relates to continuously variable speed friction gears and it is an object of the invention to combine such a gear with a planetary gear in such a manner that the speed of the driven shaft of the combined gear will be continuously variable in both directions of rotation.

It is a particular object on the invention to provide a combined friction and planetary gearing which offers a variety of output speeds in a relatively low speed range and wherein one obtains a high degree of control over the torque of the output shaft at low speeds.

Figure 1:
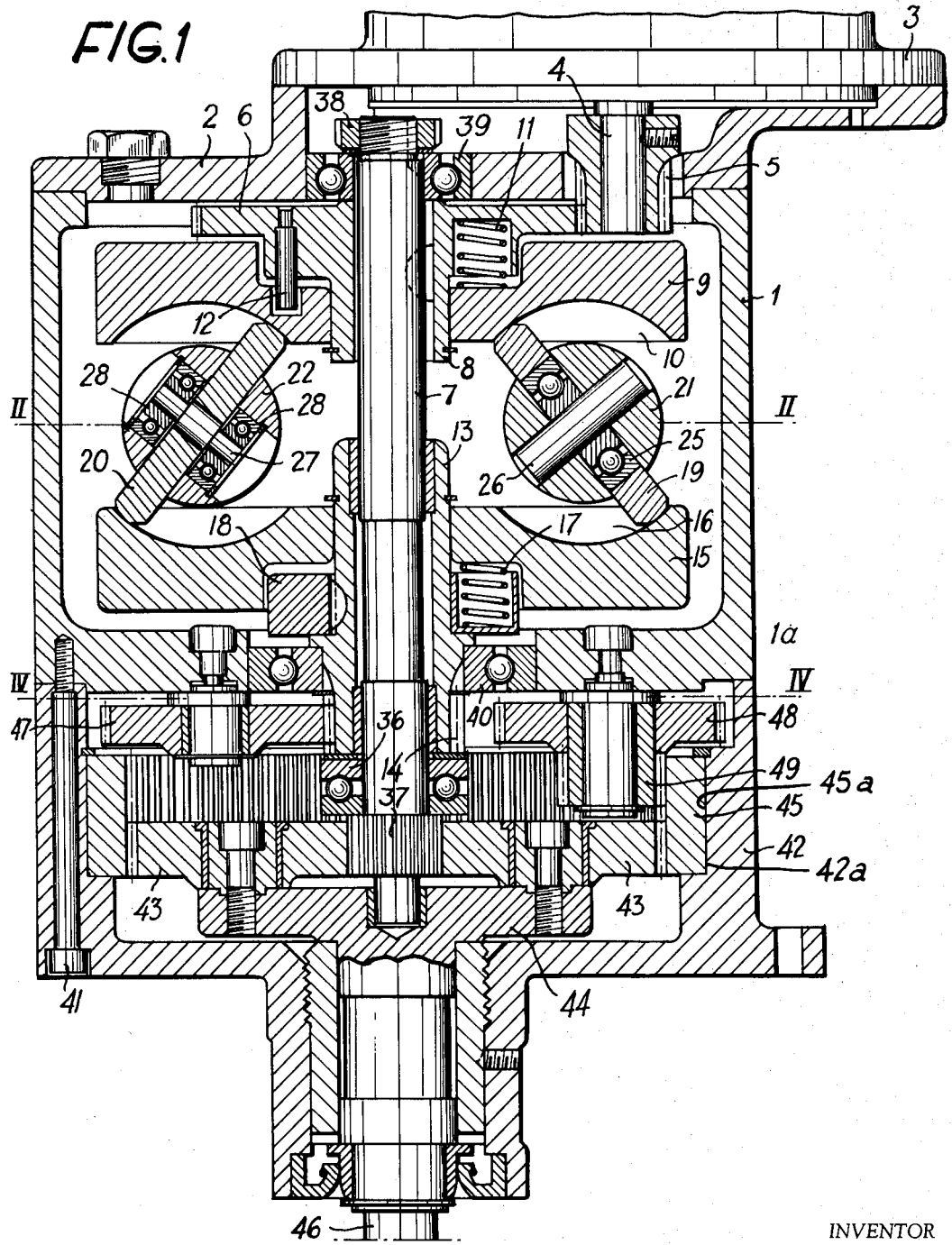
Figure 4:
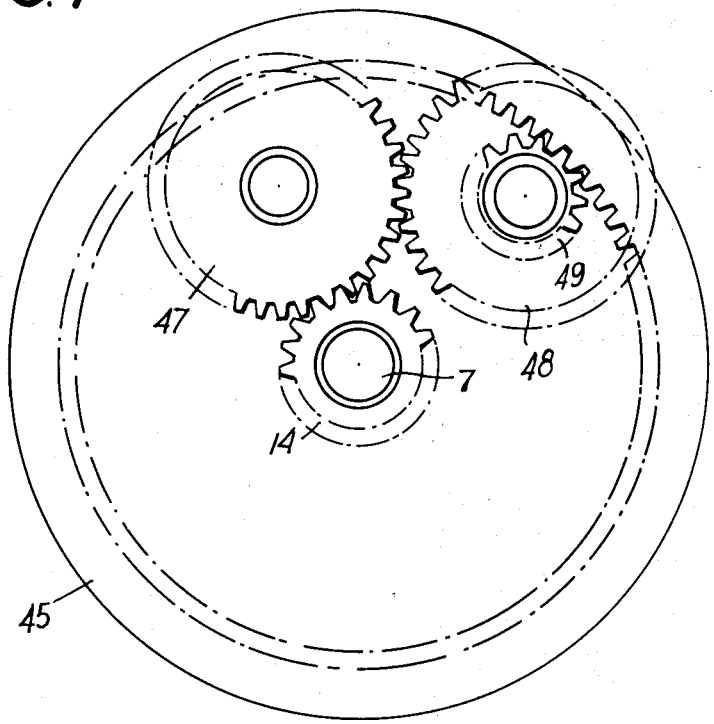
Figure 3:
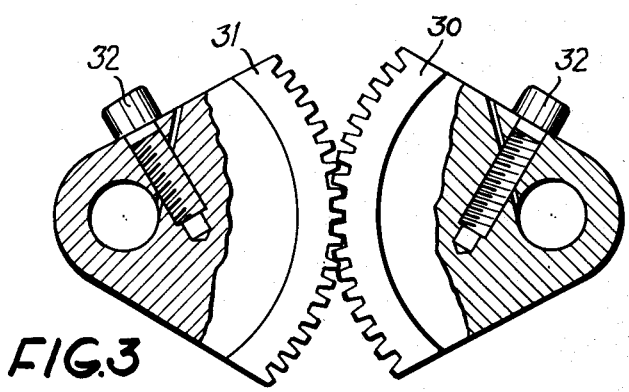

An embodiment of the invention will be described in detail in the following with reference to the accompanying drawings. In these Fig. 1 is a longitudinal section through a continuously variable speed gear according to the invention. Fig. 2 is a section on line II—II of Fig. 1. Fig. 3 shows a detail of a control mechanism for varying the ratio of transmission. Fig. 4 is a section on line IV—IV of Fig. 1.

In the figures 1 denotes a cylindrical housing enclosing a continuously variable speed friction gear described in the following. The housing has a cover 2 to which is bolted an electric motor 3, shown in part and having a shaft 4 extending into the housing 1. On the shaft 4 is mounted a gear wheel 5 meshing with a gear wheel 6 mounted on and keyed to a shaft 7 journalled substantially centrally in the housing 1. The gear wheel 6 has a hub portion 8 on which is mounted a circular disc 9 having an annular groove 10 which in cross section has the shape of a circular segment. The gear wheel 6 has sockets for receiving coil springs 11, and further there are provided driving pins 12 entering both the gear wheel 6 and the disc 9.

On the shaft 7 is revolubly mounted a sleeve 13 which at one end is formed with a pinion 14. On the sleeve 13 is mounted a disc 15 similar to the disc 9, i. e. having an annular groove 16 which in cross section has the shape of a circular segment and being subjected to pressure from springs 17 disposed in sockets in a ring 18 keyed to the sleeve 13. There are further provided driving means (not shown) for causing the ring 18 to rotate with the disc 15 and in turn cause the sleeve 13 and the pinion 14 to rotate.

Between the discs 9 and 15 are disposed two intermediate wheels 19 and 20 journalled in carriers 21 and 22 respectively which in turn are revolubly mounted between pivots 23 and 24 (Fig. 2) mounted in the housing and threaded so as to form adjustable bearings for the carriers 21 and 22. In Fig. 1 there are shown two different ways of mounting the intermediate wheels, the wheel 19 being mounted on a ball bearing 25 on a fixed shaft 26, and the wheel 20 being secured to a shaft 27 mounted in ball bearings 28.

On each carrier 21, 22, on a reduced portion 29, is mounted a segment-shaped disc 30 and 31 respectively which are slotted and provided with clamping screws 32 for clamping the segments to the carriers (Fig. 3). The discs are formed with teeth at the periphery, the teeth on one segment meshing with the teeth on the other segment, so that the movement of one disc is copied by the other. The teeth on the disc 30 are longer than the teeth on the disc 31, and with the projecting portion thus formed meshes a gear wheel 33 mounted on the shaft 34 of a control member 35. It will be realized that rotation of the control member will cause the carriers 21 and 22 to rotate through the same angle but in opposite directions.

The radius of the intermediate wheels 19, 20 corresponds with the radius of curvature of the annular concave grooves 10 and 16. On the shaft 7 is mounted a thrust ball bearing 36 bearing against a shoulder on the shaft formed into a gear wheel 37. To the upper end of the shaft 7 is threaded a nut 38 which through a radial ball bearing 39 serves to force the discs 9 and 15 in the direction towards each other and into contact with the intermediate wheels 19 and 20. When the nut 38 is tightened the resulting axial pressure is taken up between the nut and the thrust ball bearing 36 through the sleeve 13, the ring 18, the disc 15, the intermediate wheels 19 and 20, the disc 9 and the gear wheel 6. The interposed springs 11 and 17 serve to give a certain degree of resiliency to the system.

It will be realized that the carriers 21 and 22 will determine the position of the discs 9 and 15 which at least to some extent are movable in the axial direction. This serves to fully equalize the forces exerted by the discs 9 and 15 on the intermediate wheels 19 and 20.

Turning the control member 35 causes the intermediate wheels 19 and 20, the axes of which always intersect the axis of the shaft 7, to take up different positions of angularity relatively to the axis of the shaft 7. In the position shown in Fig. 1 the wheels 19 and 20 cooperate with the inner portion of the annular groove 10 in the disc 9 and with the radially outer portion of the annular groove 16 in the disc 15, thus causing the latter disc to rotate at a lower speed than the disc 9 which rotates at the same speed as the shaft 7. When the axes of the wheels 19 and 20 are at right angles to the shaft 7, as shown in Fig. 2, both discs 9 and 15 will rotate at the same speed. If the wheels 19 and 20 are turned so that they cooperate with the outer portion of the groove 10 and with the inner portion of the groove 16 the disc 15 will rotate at a higher speed than the disc 9 and the shaft 7. The direction of rotation of the disc 15 will, however, always be opposite to that of the shaft 7.

It will be realized that the power supplied by the driving shaft can be taken out at various speeds from the pinion 14 at the end of the sleeve 13 which is journalled in the bottom wall 1a of the housing 1 in a ball bearing 40. The friction speed gear is, however, combined with a planetary gear which is disposed in a second cylindrical housing 42, preferably oil-filled, of the same diameter as and axially secured to the housing 1 by means of screws 41. Thus the gear wheel 37 at the lower end of the shaft 7 meshes with planet wheels 43 carried by a rotatable planet wheel carrier 44 and meshing with a gear ring 45 mounted in the housing 42. The housing 42 is provided at its inner surface with a cylindrical journal bearing seat 42a and the gear ring 45 has a complementary cylindrical journal bearing surface 45a supported upon the cylindrical seat 42a of the housing. The sleeve bearing thus provided for gear ring 45 increases the friction to give a better degree of torque control of the output shaft 46 in the range of relatively low speeds at which the gear ring 45 and output shaft 46 operate. The planet wheel carrier 44 is formed with a shaft 46 extending through the housing 42 and forming the driven shaft of the combined gear.

The pinion 14, which is driven at a variable speed by the friction gear, through a gear wheel 47 meshes with a gear wheel 48 which for the sake of clearness, in Fig. 1, is shown as separated from the intermediary wheel 47. Coaxial with the gear wheel 48 and rotatable therewith is a gear wheel 49 meshing with the gear ring 45. The even number of gears 47, 48 constitute a reduction gearing from gear wheel 14 to the gear ring 45 causing the latter to rotate at relatively low speeds. As the gear wheels 14 and 37 rotate in opposite directions and gear wheel 37 meshes with the gear ring 45 through one intermediary gear wheel and the wheel 14 through two intermediary gear wheels, wheel 14 will drive the gear ring 45 in the direction opposite that of motion imparted to it by wheel 37. If the speed of rotation of the pinion 14, for example when the shafts 26 and 27 of the intermediate wheels 19 and 20 are horizontal, is such that it rotates the gear ring 45 at the same peripheral speed as the constant peripheral speed of rotation of the gear wheel 37, then the planet wheel carrier 44 and thus also the driven shaft 46 will be at rest. If the speed of rotation of the gear wheel 14 is increased or decreased the planet wheel carrier 44 and the shaft 46 will rotate in the one or the other direction at a speed varying from zero upwards. Thus the driving shaft 4 may rotate at a speed of say 1400 revolutions per minute, and by operating the control member 35 the speed of the driven shaft 46 may be varied for example from 0 to 25 revolutions per minute in either direction.

What I claim is:

A continuously variable speed gear having a variable speed output in a relatively low speed range comprising in combination a continuously variable speed friction gear and a planetary gear, the friction gear having a driving and a driven shaft, two rotatably mounted coaxial axially displaceable discs having opposed annular concave surfaces, one disc being mounted on the driving shaft and the other being mounted on the driven shaft, said driven shaft being hollow and rotatable on said driving shaft, intermediate wheels disposed between the discs for cooperation with the annular surfaces of the discs for transmitting motion between the discs, each intermediate wheel being rotatable about an axis intersecting the axis of the discs and about an axis at right angles to the axis of the discs, means for urging the discs into frictional engagement with the intermediate wheels, and means for controlling the angularity of the intermediate wheels relatively to the axis of the discs; and the planetary gear having a first driving shaft identical with the driving shaft of the friction gear, a sun gear wheel on said first driving shaft, planet gear wheels meshing with said sun gear wheel, a gear ring toothed on the inside and meshing with the planet gear wheels, said planetary gear being enclosed within a housing having a cylindrical journal bearing seat on the inner surface of the wall thereof, said gear ring having a complementary cylindrical journal bearing surface supported upon said bearing seat of said housing, a second driving shaft in said planetary gear identical with the driven shaft of the friction gear, a gear wheel on said second driving shaft, reduction gearing comprising an even number of intermeshing gear wheels rotatable on fixed axes and constituting a driving connection between said gear wheel on said second driving shaft and said gear ring, and a planet gear wheel carrier carrying said planet gear wheels and constituting the relatively low and variable speed driven shaft of the combined friction and planetary gear.

References Cited in the file of this patent

UNITED STATES PATENTS

| 1,024,742 | Nettenstrom | Apr. 30, 1912 |
| 1,632,123 | Else | June 14, 1927 |
| 1,671,033 | Kimura | May 22, 1928 |
| 2,086,491 | Dodge | July 6, 1937 |
| 2,164,504 | Dodge | July 4, 1939 |
| 2,514,158 | Hussain | July 4, 1950 |

FOREIGN PATENTS

| 577,118 | Germany | May 24, 1933 |